(No Model.)
J. M. WISHART.
HORSE HAY RAKE.
No. 292,457. Patented Jan. 22, 1884.
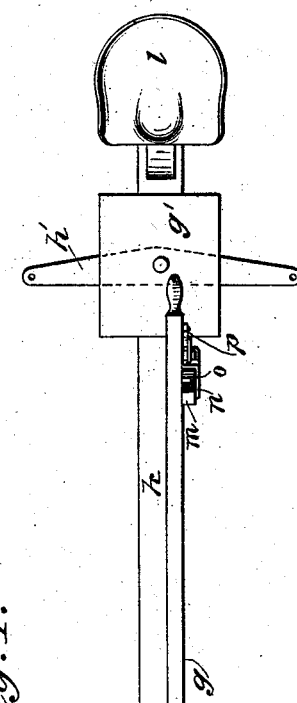
Fig. 1.
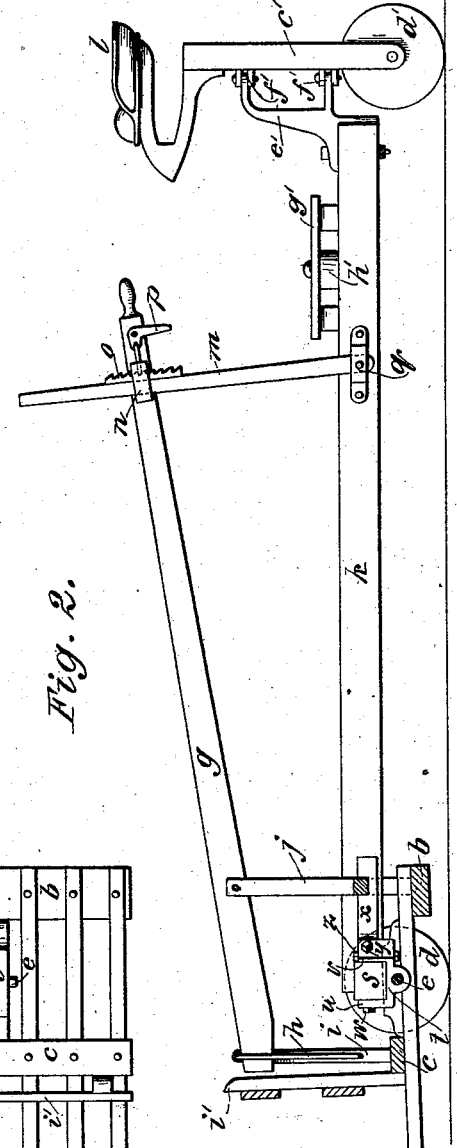
Fig. 2.
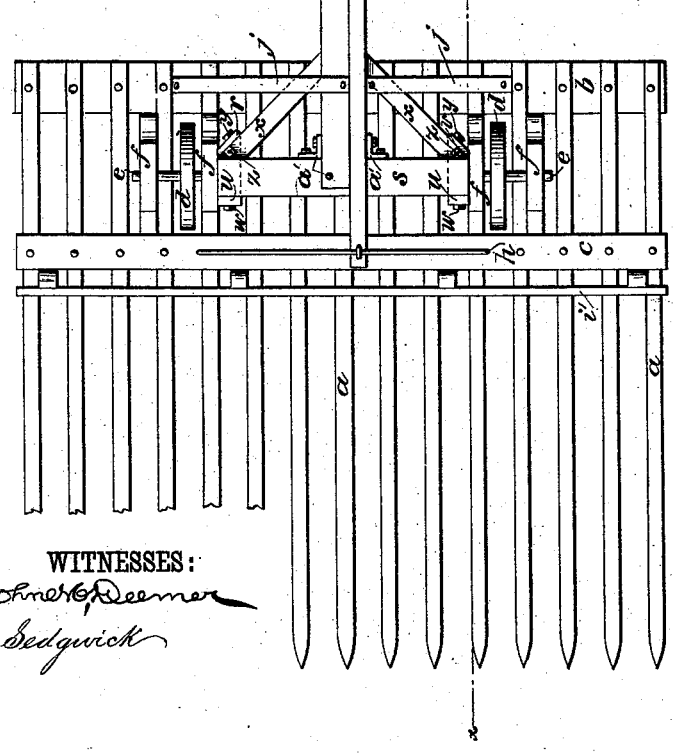
WITNESSES:
John H. Deemer
C. Sedgwick
INVENTOR:
J. M. Wishart
BY Munn & Co
ATTORNEYS.

UNITED STATES PATENT OFFICE.

JAMES M. WISHART, OF TOPEKA, KANSAS.

HORSE HAY-RAKE.

SPECIFICATION forming part of Letters Patent No. 292,457, dated January 22, 1884.

Application filed September 1, 1883. (No model.)

*To all whom it may concern:*

Be it known that I, JAMES M. WISHART, of Topeka, county of Shawnee, Kansas, have invented a new and Improved Hay-Rake, of which the following is a full, clear, and exact description.

This invention relates to improvements in hay-rakes; and it consists of the combination and arrangement of parts substantially as hereinafter fully described and claimed.

Reference is to be had to the accompanying drawings, in which similar letters of reference indicate corresponding parts in both figures.

Figure 1 is a plan view of my improved hay-rake, and Fig. 2 is partly a side elevation and partly a section on the line $x$ $x$, Fig. 1.

The teeth $a$ of the rake are attached to the cross-bars $b$ and $c$, which form the head of the rake, the bar $b$ being under the upper or rear ends of the teeth, and the bar $c$ being placed over the teeth at a suitable distance forward of the rear ends to provide sufficient space for the wheels $d$, on which the rake is supported, to be located between said bars.

The rake thus constructed is pivoted on the axle $e$ by the boxes $f$, attached to some of the rake-teeth on the opposite sides of the rake, and the front bar, $c$, is connected to the forward end of the regulating-lever $g$ by the bent tension-rod $h$ and the strut $i$. The rear bar, $b$, of the rake-head is connected to said lever directly over said bar by the strut-braces $j$, said braces and the tension-rod $h$ being suitably extended laterally to afford substantial lateral as well as vertical rigidity. The lever $g$ extends along the push-bar $k$ to within suitable proximity to the driver's seat $l$, where it connects with a vibrating standard, $m$, by a keeper, $n$, which slides up and down said standard to allow the lever to be shifted, and said lever and standard are provided with a ratchet and pawl, $p$, to hold the lever in different positions. The standard $m$ is pivoted to the push-bar $k$ to allow the necessary vibration for the lever to shift along the standard, which, in this example, is straight; but said bar may be curved on a radius from the axis of the axle $e$, and in that case will not require to be pivoted. The push-bar $k$ is connected at the front end to a strong beam, $s$, forming a T-head, which has a metal box, $t$, at each end, fitted on the axle $e$, for the connection of the push-bar to the rake, so that the rake may be vibrated by the lever $g$, to alter the inclination of the teeth and their height from the ground, the lever being shifted up and down the standard $m$, and the rake turning on the axle $e$ as the fulcrum of the lever $g$. The boxes $t$ have flanged extensions $u$ extending up and embracing one side of the beam $s$, to be secured thereto by bolts $w$. They also have flanges $v$ on the other sides, that are formed on backward extensions of the boxes, and inclined suitably to embrace the sides of the diagonal braces $x$, connecting the beam $s$ and the push-bar, one to each side of the push-bar, said braces being secured in the angles between said flanges and the beam by the bolts $y$ and $z$, forming a substantial connection of the push-bar and head. In addition thereto the angle-plates $a'$ are bolted in the angles at the junction of the push-bar and beam, forming a more substantial construction, well calculated to sustain the shocks and strains to which the machine will be subject in use. The rear end of the push-bar $k$ is supported on the post $c'$ of the caster-wheel $d'$, to which it is hinged by the bracket $e'$ and joints $f'$, so that the rake may be guided by altering the direction of the caster-wheel, which will be effected by the driver pushing with his feet on the foot-rest $g'$, suitably placed on the push-bar in front of the seat. The team is to be hitched to the double-tree $h'$ in front of the seat $l$ and behind the rake.

The hay is to be gathered on the teeth in front of the rack $i'$, that keeps it clear of the wheels.

Having thus described my invention, I claim as new and desire to secure by Letters Patent—

1. The combination of the wheel $d$, axle $e$, the rake pivoted on said axle, and having bars $b$ $c$, one in rear and the other in front of said wheels, the regulating-lever $g$, the braces $j$, tension-rod $h$ and strut $i$, connecting said lever to said bars, the standard $m$, ratchet $o$, and pawl $p$, substantially as and for the purpose set forth.

2. The combination of the wheels $d$, axle $e$, the rake pivoted on said axle, and having bars $b\ c$, one in rear and the other in front of said wheels, the regulating-lever $g$, the braces $j$, tension-rod $h$, and strut $i$, connecting said lever to said bars, substantially as and for the purpose set forth.

3. The boxes $t$, having flanges $y$ and $v$, in combination with the beam $s$, diagonal braces $x$, and push-bar $k$, substantially as described.

JAMES M. WISHART.

Witnesses:
WILLIAM H. H. THATCHER,
R. B. McMASTER.